United States Patent [19]

Scott

[11] E Re. 29,421

[45] Reissued Sept. 27, 1977

[54] LASER SYSTEM HAVING ELECTRONICALLY SELECTABLE GAIN

[75] Inventor: Warner C. Scott, Dallas, Tex.

[73] Assignee: Texas Instruments Incorporated, Dallas, Tex.

[21] Appl. No.: 394,001

[22] Filed: Sept. 4, 1973

Related U.S. Patent Documents

Reissue of:

[64] Patent No.: 3,725,812
Issued: Apr. 3, 1973
Appl. No.: 147,049
Filed: May 26, 1971

[51] Int. Cl.[2] ..... H01S 3/11

[52] U.S. Cl. ..... 331/94.5 Q; 350/161 W

[58] Field of Search ..... 331/94.5; 350/160, 161 W; 330/4.3

[56] References Cited

U.S. PATENT DOCUMENTS

| | | | |
|---|---|---|---|
| 3,297,876 | 1/1967 | DeMaria | 331/94.5 |
| 3,418,476 | 12/1968 | Muller et al. | 331/94.5 |
| 3,614,462 | 10/1971 | Lean et al. | 331/94.5 |

*Primary Examiner*—William L. Sikes
*Attorney, Agent, or Firm*—Harold Levine; James T. Comfort; William E. Hiller

[57] ABSTRACT

A laser system for selectively producing, in response to electronic signals, laser pulses at random intervals and of preselected and variable energy, including a laser cavity capable of being electronically controlled to effect a selectively variable gain. An acousto-optic deflector is disposed in the laser cavity and the amount of acoustic energy applied to the deflector controls the amount of radiation feedback to the laser rod and thus controls the Q or gain of the laser system to any of a wide range of selectable values.

19 Claims, 17 Drawing Figures

LASER SYSTEM HAVING ELECTRONICALLY SELECTABLE GAIN

Matter enclosed in heavy brackets [ ] appears in the original patent but forms no part of this reissue specification; matter printed in italics indicates the additions made by reissue.

This invention pertains to laser systems in general and, in particular, to a laser system having an electronically variable lasing threshold.

In certain applications, it is advantageous to obtain laser pulses with preselectable and variable energy at preselectable and variable time intervals. Such pulses are useful, by way of example, in numerous pulse code applications, both digital and analog. Conventionally, a series of laser pulses may be produced by a continuous wave laser using Q-switching techniques, but the laser pulses occur at specific and unvariable time intervals and have an unregulable energy level. Multiple pulses may also be produced from flash pumped lasers within the duration of a single flash by Q-switching techniques. A major problem associated with this technique of operation, however, is associated with the fact that the energy or peak power of each Q-switched laser pulse is significantly affected by both the population inversion in the laser material at the onset of Q-switching and by the population inversion corresponding to the lasing threshold of the system which, in turn, depends on both the energy feedback to the laser resonator or cavity, and the time scale of introducing this feedback.

With respect to conventional Q-switched lasers, an important feature of these lasers is the fact that the operation of the Q-switching element is typically on-off; that is, the Q-switching is characterized by a rapid transition from a high loss low Q state to a low loss high Q state. Even more significant is the fact that the low loss high Q state is generally fixed by the physical constraints of the laser cavity; that is, by the laser material itself, the reflectivity of the surfaces that form the boundary of the laser cavity, etc. Q-switching elements that are conventionally utilized include mechanical elements, such as a rotating prism, electro-optic elements which are capable of rotating the polarization of the laser beam, acousto-optic elements which scatter the beam off propagating sound waves, saturable absorbers, and other switching elements well-known to those skilled in the art.

In order to control the power or time at which a laser pulse is initiated, means for Q-switching are generally required. Since the initial or minimum lasing threshold of a laser system is generally defined by the physical characteristics of the laser cavity itself and since the Q-switching means typically have on-off characteristics, to date it has not been possible to independently vary both the energy level and the time of initiation of laser pulses using Q-switching techniques.

Accordingly, an object of the present invention is to produce a laser system for effecting an arbitrary sequence of pulses with preselected and variable energy levels.

An additional object of the invention is to produce a flash pumped laser system wherein the lasing threshold or threshold population inversion of the laser cavity may be varied from pulse to pulse.

A further object of the invention is to provide a laser system that includes an acousto-optic beam deflector effective to variably control the Q of the laser cavity in response to an electronic signal.

In accordance with the present invention, a laser system for selectively producing variable energy laser pulses at variable time intervals is disclosed. The laser system includes a lasing medium positioned in a cavity together with an electronically controllable optical device in an arrangement such that the Q of the cavity may be selectably varied. Means are provided for optically pumping the laser material to produce a population inversion therein. Control means are provided for furnishing signals that respectively correspond to the energy level and time sequence of the desired laser pulses. An acousto-optic deflector is disposed along the longitudinal axis of the lasing medium between the laser medium reflecting means to variably change the amount of energy feedback to the laser medium responsive to the signals from the control means. This is effective to vary the Q of the laser cavity. In one aspect of the invention, first reflective means are displaced from the longitudinal axis of the laser medium and second reflective means are disposed along a line joining the first reflective means and the deflector, the second reflective means being positioned such that the deflector lies between the first and second reflective means. The second reflective means increases the efficiency of the laser system by reflecting the radiation that passes directly through the deflector. In another aspect of the invention, a partially reflecting mirror may be disposed in the output path of the laser pulse to provide a residual feedback to the laser rod that is less than the feedback required for lasing.

FIG. 1 diagrammatically illustrates a laser system in accordance with one embodiment of the present invention.

The present invention will be described as it pertains to a flash pumped laser. It is understood, of course, that continuous wave laser systems may be utilized in accordance with the invention, if desired.

Figure 1:
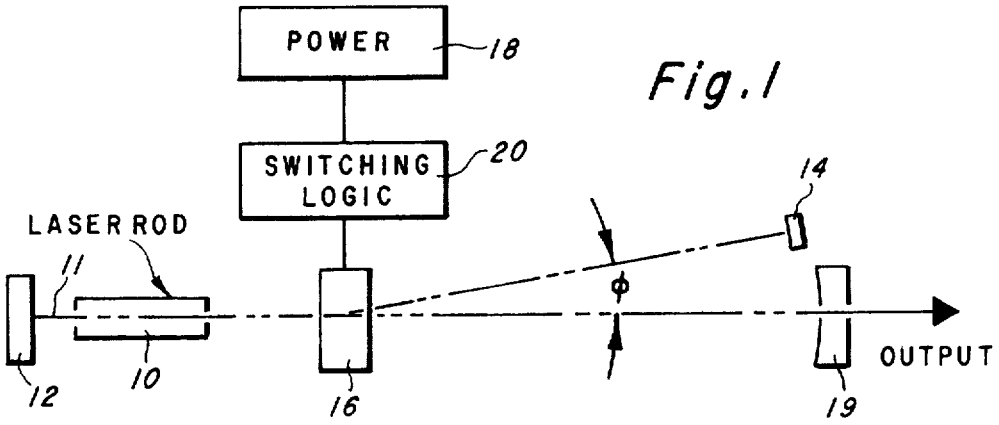

With reference to FIG. 1, a laser system in accordance with one embodiment of the present invention is illustrated. A lasing medium is shown pictorially at 10 as a laser rod. Any laser material may be utilized in accordance with the present invention, including high gain neodymium-yttrium aluminum garnet, ruby, neodymium glass, etc. The laser rod 10 is positioned substantially between two reflecting surfaces 12 and 14. The reflecting surface 12 is preferably a 100 percent reflecting mirror and is positioned so that it is substantially perpendicular to the longitudinal axis 11 of the laser rod 10. The reflecting surface 14 is positioned from the laser rod 10 opposite from the reflecting surface 12, and the reflecting surface 14 is slightly displaced from the longitudinal axis of the laser rod 10. The displacement of the reflecting surface 14, illustrated in FIG. 1, is not to scale and is exaggerated for purposes of illustration. Preferably, the reflective surface 14 is disposed along a line that forms an angle $\phi$ with the longitudinal axis in the laser rod 10. An acousto-optic beam deflector 16 is disposed along the longitudinal axis of the laser rod 10 and is positioned to lie between the laser rod 10 and the reflecting surface 14. The reflecting surface 14 is disposed so that it is substantially perpendicular to the line joining the deflector 16 and the reflecting surface 14. For the embodiment illustrated in FIG. 1, the output of the laser system may be considered as being obtained through an essentially 100 percent transmitting output mirror 19, which is positioned along the longitudinal axis of the laser rod 10 on the opposite side of the deflector 16 from the laser rod. If desired, the mirror 19 may be omitted. A source of RF energy is shown at 18 connected to logic switching circuitry 20. The logic switching circuitry 20 is effective to apply RF energy from the source 18 to the acousto-optic beam deflector 16 at time intervals and at power levels corresponding to the desired laser output pulses, as will be explained hereinafter. Logic switching circuitry that may be used for this function is well-known in the art and need not be explained herein. Sources of RF energy are likewise well-known in the art and require no further explanation. The reflecting surface 14 is preferably a 100 percent reflecting mirror. Reflecting surfaces of various reflectivities may be utilized for reflecting surfaces 12 and 14, if desired, it being understood, of course, that for reflectivities of less than 100 percent, the efficiency of the laser system will correspondingly be decreased.

The angle $\phi$ is determined by the frequency of RF power, the characteristic wavelength of the laser, and the acousto-optic material itself. For example at 100 MHz RF power, where the characteristic wavelength of the laser is 1.064 micrometers (Nd:YAG) and fused silica is used for the acousto-optic device, the angle $\phi$ is approximtely 1°.

The acousto-optic beam deflector 16 switches the Q of the laser cavity or resonator to an electronically controllable value, which may be varied from pulse to pulse by the switching circuitry 20. The principles of acousto-optic light deflection are well-known to those skilled in the art. For example, reference Fine et al, IEEE Transactions on Sonics and Ultrasonics, Vol. SU-14, page 123, July 1967. The acousto-optic beam deflector utilizes a high frequency sound wave to scatter light. For a fixed light wavelength, such as is present in a laser system, and for a fixed sound frequency, the acousto-optic beam deflector deflects light at a fixed angle and furthermore deflects a fraction of the incident beam which is a monotonic increasing function of the applied ultrasonic power. The amount of or fraction of light deflected is generally linear over a very wide range of applied power.

In operation, a source (not shown) for flash pumping the laser material 10 to produce a population inversion in the laser material is energized. With the acoustic or RF power 18 switched off, the laser cavity has a round-trip loss of almost 100 percent and therefore it will not lase short of superradiance. In other words, energy emitted by the laser rod 10 along the longitudinal axis thereof passes directly through the 100 percent transmitting output mirror 19 and there is no feedback to the laser rod. A typical flash of pumping energy is shown as a function of time at 22 in FIG. 2. The population inversion produced in the laser material 10 resulting from the flash of energy 22 is shown as a function of time at 24. As may be seen, there is a certain amount of lag between the flash of energy 22 and an increase in the population inverson in the laser material.

Again, with reference to FIG. 1, assume now that the acoustic power 18 is switched on by the switching circuitry 20 at a power level corresponding to scattering a fraction F of light. For this situation, considering one round trip of energy in the laser cavity, it may be seen that 1-F of the beam is transmitted through the output mirror 19, $F^2$ of the beam is reflected as feedback into the laser rod 10 and F (1-F) of the beam is lost; that is, it is neither transmitted through the output mirror 19 nor reflected back into the laser rod 10. TABLE I depicts for various values of F the percentage of energy that is (1) transmitted to the output (2) feedback energy, and (3) energy lost.

TABLE I

| F | Output | Feedback | Lost |
|---|---|---|---|
| 10% | 90% | 1% | 9% |
| 20% | 80% | 4% | 16% |
| 30% | 70% | 9% | 21% |
| 40% | 60% | 16% | 24% |
| 50% | 50% | 25% | 25% |

In any event, it is apparent that by controlling the fraction of the beam reflected by the acousto-optic element 16, the amount of feedback to the laser rod may be varied. This, in turn, varies the gain of the laser cavity which, in turn, varies the threshold population inversion or lasting threshold. It is this fact that enables one to randomly produce a plurality of laser pulses from a single flash of pumping energy wherein respective ones of the plurality of laser pulses may have selectable and variable energy levels. The manner in which the acousto-optic deflector 16 enables one to control the lasting threshold of the laser cavity from pulse to pulse within the duration of a single flash of pumping energy may better be understood with reference to FIGS. 2-6.

For clarity of description, FIGS. 3 and 4 illustrate the relationship between time sequence and the energy level for two output pulses. It is to be understood, however, that any desired number of output pulses of any desired (and not necessarily equal) energy may be produced in accordance with the present invention.

Figure 2:
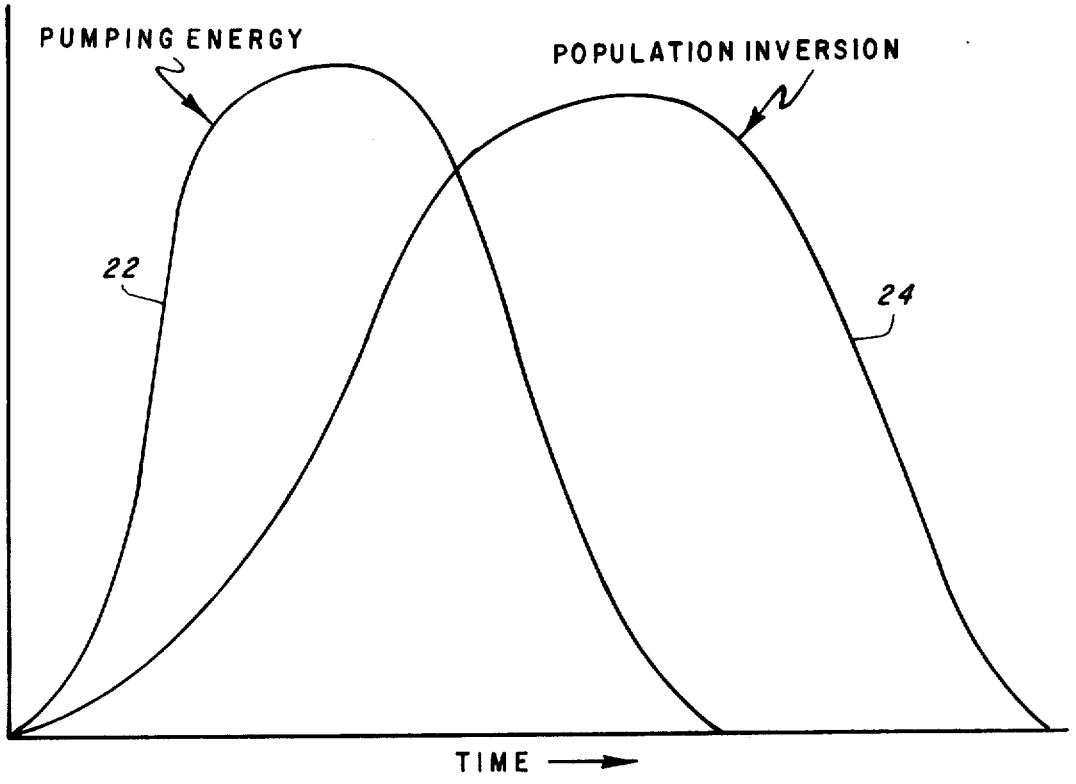
FIG. 2 is a graph of population inversion produced in the laser rod in response to a single flash of pumping energy.

Referring now to FIG. 2, it may be seen that the level of population inversion in the laser material 10 increases as a function of time to a maximum and then decreases back to zero, generally corresponding to the energy distribution of the pulse pumping the laser material. It is assumed, of course, that no lasing action takes place; that is, FIG. 2 corresponds to the situation in FIG. 1 where the acousto-optic beam deflector 16 receives no acoustic energy and thus there is a 100 percent round trip loss for energy emitted by the laser rod 10.

At this juncture, it should be recalled that the initial lasting threshold of a given laser cavity is generally defined by the physical elements of the cavity itself; that is, by the type of laser material utilized, by the reflectivity of the reflecting surfaces defining the boundaries of the laser cavity, by the distance the reflecting surfaces are separated, etc. Thus, the lasing threshold of a given system is generally set thereby defining the Q of the laser system. Q-switching means may be disposed within the cavity but, as explained previously, Q-switching elements are typically characterized by on-off functions. That is, when the Q-switch is off, the lasing threshold is very high since there is essentially no feedback to the laser material. When the Q-switch is turned on, however, the lasing threshold immediately decreases to that value established by the physical constraints of the laser cavity.

Figure 3A:
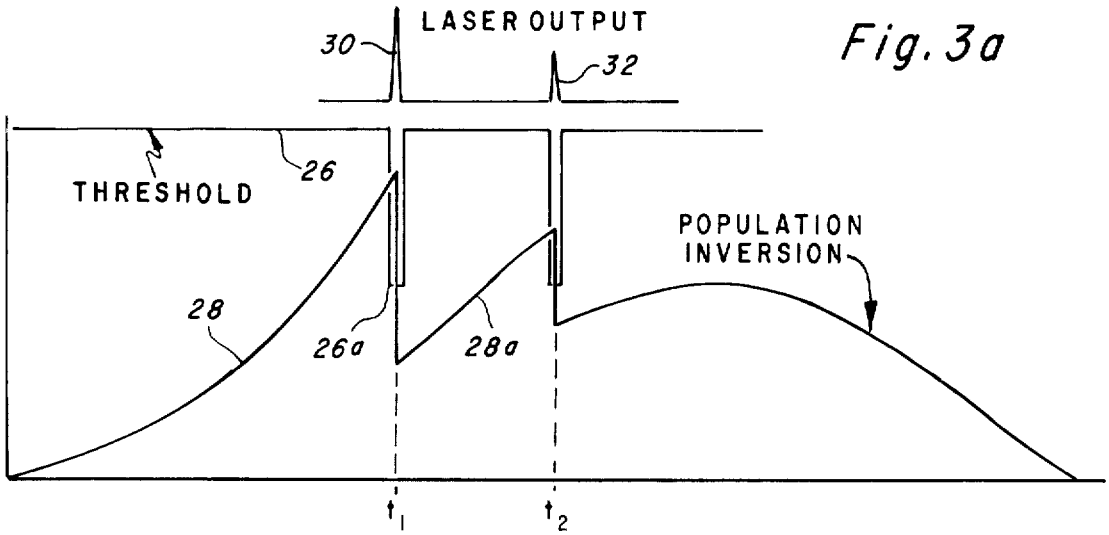
FIGS. 3a–3c is a graph of the output pulses that may be obtained with a fixed Q laser cavity.
Figure 3B:
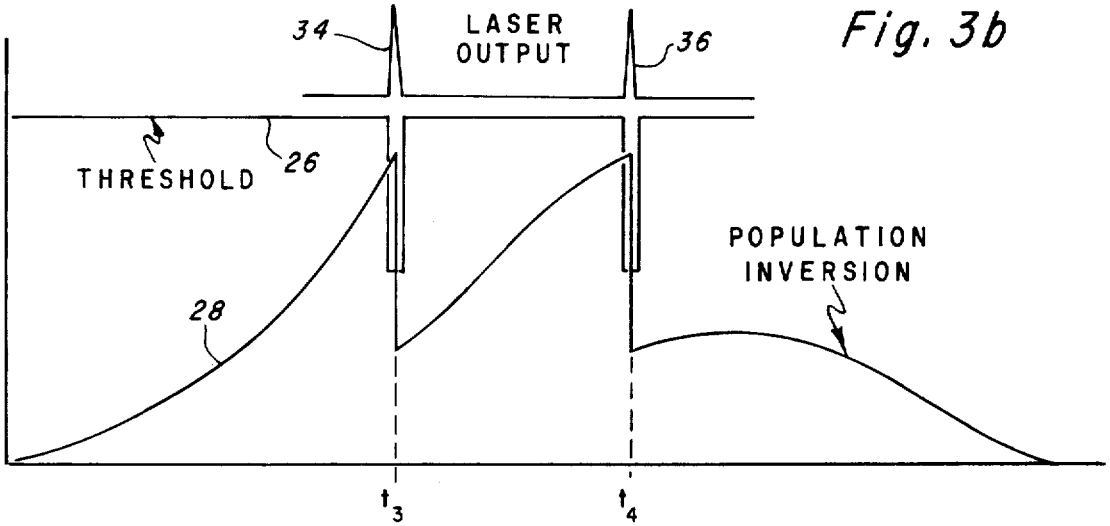
Figure 3C:
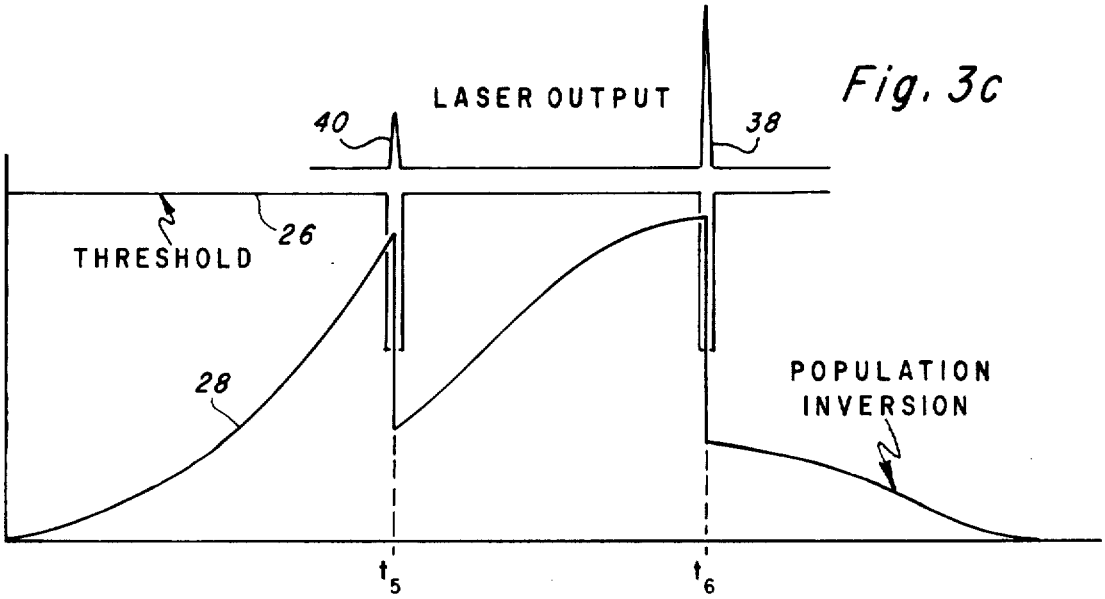

With reference to FIG. 3a, operation of a laser system having a fixed lasing threshold will be described. Such a system would differ from FIG. 1, for example, in that the Q-switch 16 would be characterized only by on-off response functions, and the reflective surface 14, which would be partially reflective to enable an output, would be positioned along the longitudinal axis of the laser rod 10. Assuming that the Q-switch is turned off, the lasing threshold of the laser cavity is extremely high. This threshold is depicted in FIG. 3 at 26. At time $t_1$, the Q-switch is switched on, thereby reducing the threshold 26 to a value 26a defined by the physical characteristics of the laser cavity itself. The population inversion of the laser material is shown by curve 28. As may be seen, prior to the switching at $t_1$, the population inversion rises to a value greater than 26a but less than the threshold 26. At the time $t_1$, Q-switching occurs and since the population inversion is above the lasing threshold 26a, laser action occurs. The amount of power in the laser output is proportional to the amount above the threshold 26a that the population inversion 28 had reached prior to Q-switching. The level of the population inversion 28, upon Q-switching, varies about the lasing threshold 26a; that is, the population inversion level 28 decreases below the threshold 26a by an amount related to the amount above the threshold 26a that the population inversion had reached prior to Q-switching. Since the population inversion decreases below the lasing threshold 26a, lasing action stops, the Q-switch is turned off, and the population inversion begins to increase again in the region 28a. At a time $t_2$, Q-switching again takes place. As illustrated, the population inversion is at a lower level at time $t_2$ than it was at time $t_1$ and thus the energy of the laser output pulse that is obtained will be correspondingly less. Typical laser outputs obtained when Q-switching occurs at time $t_1$ and $t_2$ are shown at 30 and 32. With reference to FIG. 3b, Q-switching is effected at times $t_3$ and $t_4$. The times $t_3$ and $t_4$ are selected such that the population inversion 28 in the laser rod is allowed to reach the same value prior to Q-switching. Thus, the laser output pulses 34 and 36 are the same energy level. With reference to FIG. 3c, Q-switching is effected at times $t_5$ and $t_6$. In this example, the population inversion level 28 at time $t_5$ is less than the level of population inversion at $t_6$. Thus the output pulse 38 corresponding to time $t_6$ is larger than the output pulse 40 which corresponds to switching at $t_5$. It may be seen that for fixed lasing threshold Q-switching systems, the amount of energy in the laser output pulse is a function of time. In other words, for any two given times at which Q-switching occurs, the output pulses in the laser will always be the same; the energy level of the output pulse and the time interval at which it occurs cannot be independently varied.

Figure 4A:
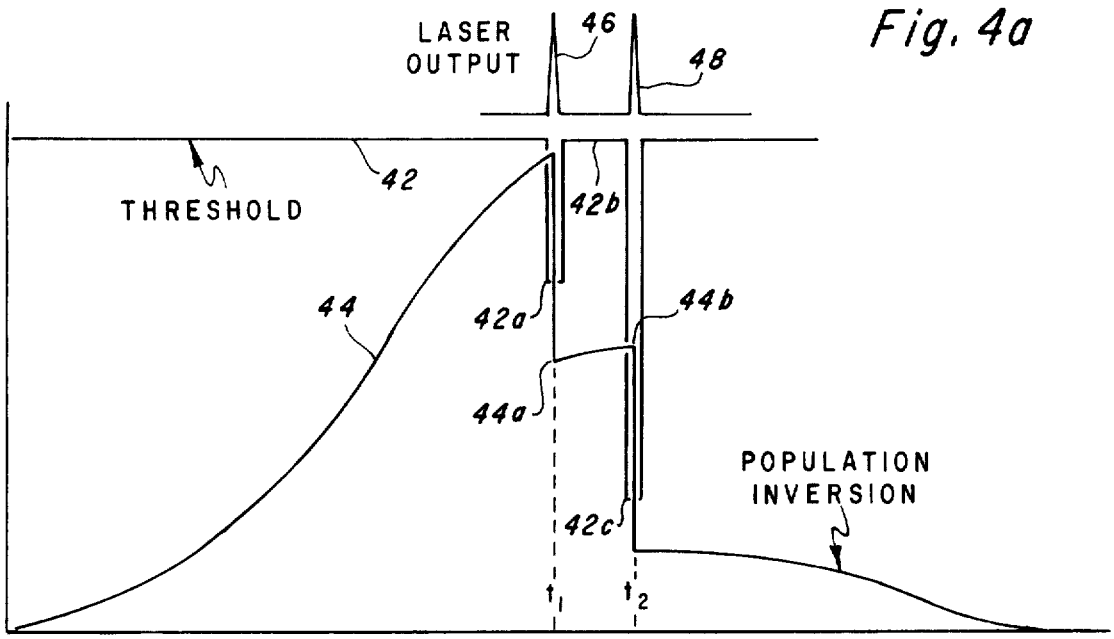
FIGS. 4a–4c are graphic illustrations of output pulses that may be obtained in accordance with the variable Q laser cavity of the present invention.
Figure 4B:
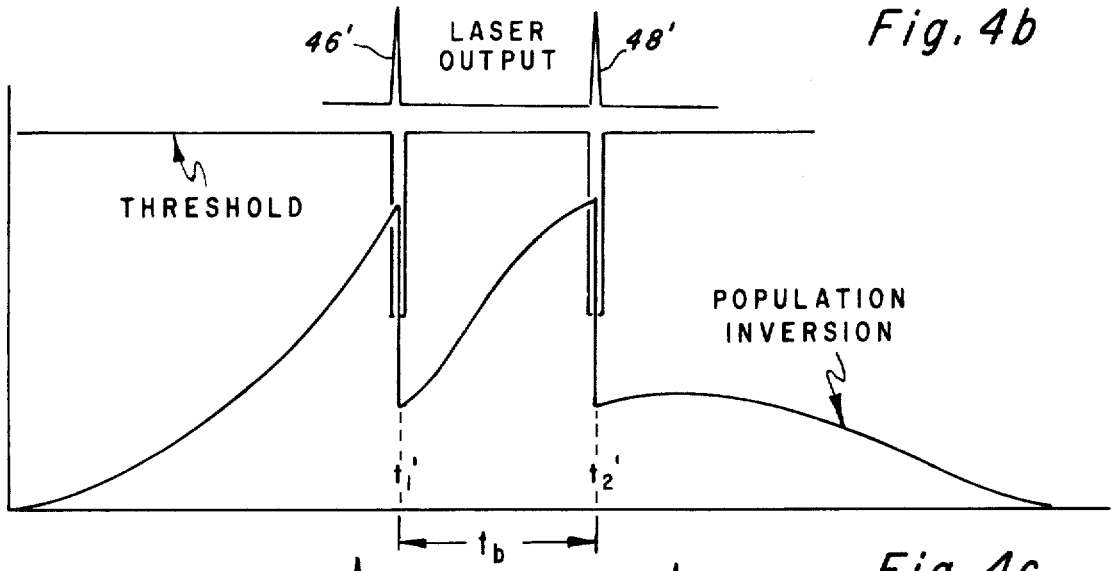
Figure 4C:
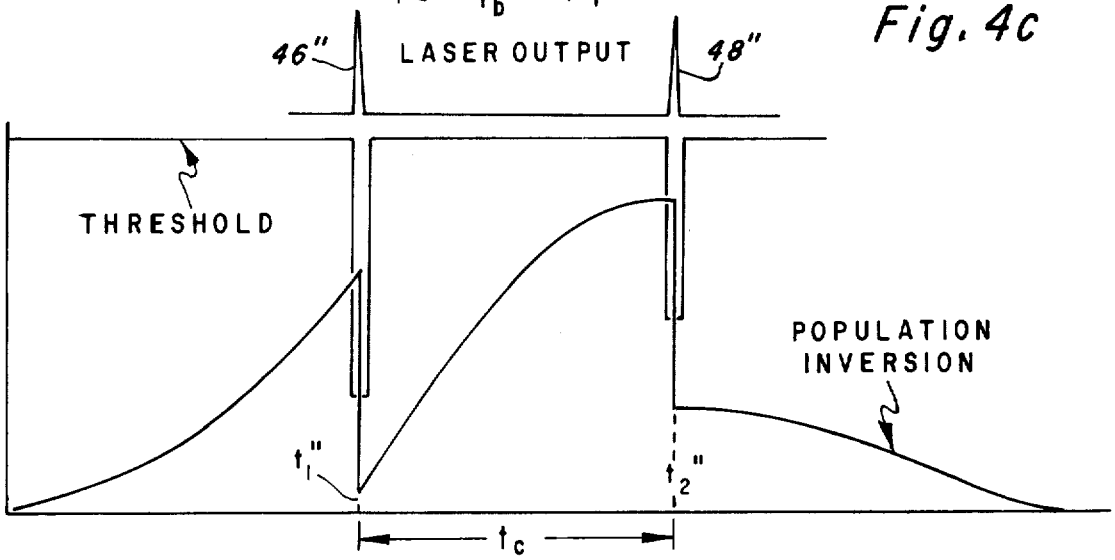

With reference to FIG. 4, operation of the variable Q laser cavity of the present invention may more readily be understood. Recognizing that the ratio of the laser population inversion to the lasing threshold determines the energy or the peak power of the output pulse of the laser system, it may be seen that if means are available for varying the lasing threshold of the laser cavity, the output power and time interval of the output pulses may be independently varied. FIGS. 4a, 4b and 4c illustrate examples wherein Q-switching is effected at different time intervals between successive pulses and the energy in each output pulse is maintained equal. With respect to FIG. 4a, the lasing threshold with the acousto-optic beam deflector 16, such as in FIG. 1, turned off, is indicated in the region 42 and is above the maximum population inversion 44 in the laser rod 10 produced in response to a pulse of pumping energy. At time $t_1$, the acousto-optic beam deflector 16 is energized to produce a laser pulse 46 of predetermined magnitude. The logic switching circuitry 20 is energized to apply a predetermined value of RF energy from the source 18 to define the desired level of the lasing threshold 42a.

As explained previously, by varying the amount of RF energy applied to the [acouto-optic] *acousto-optic* beam deflector, the amount of feedback to the laser rod 10 may be varied, thereby varying the gain of the laser cavity and thus establishing lasing threshold 42a. Since the amount of feedback may be controlled by varying the power to the acousto-optic beam deflector 16, the value of the lasing threshold 42a may be varied to different preselected values. This may be observed by reference to FIG. 5 which shows the relationship between RF power applied to an acousto-optic reflector and the lasing threshold of the laser system herein described.

Figure 5A:
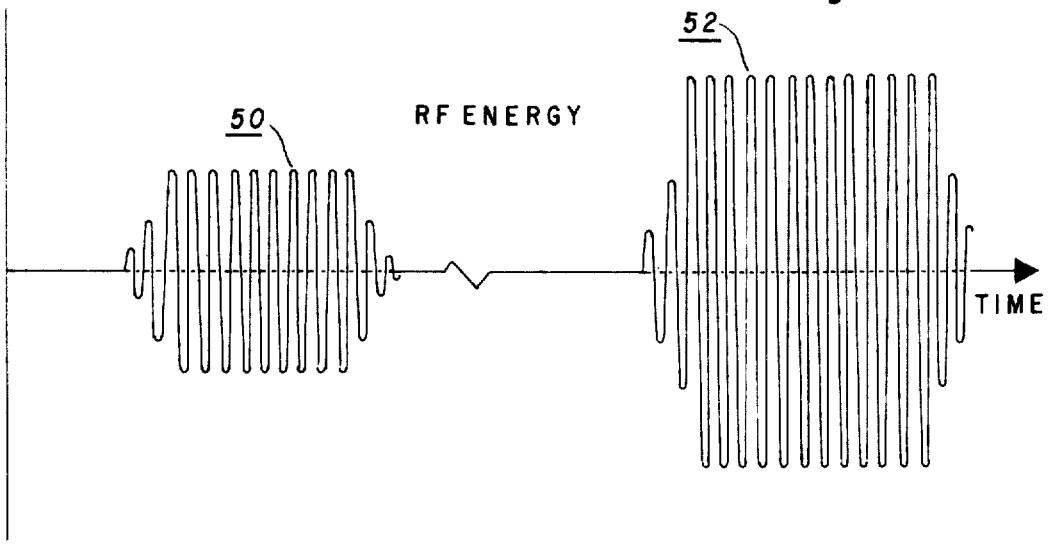
FIGS. 5a–5b is a graph showing the relationship between RF power applied to an acousto-optic deflector and the lasing threshold of the laser system of the present invention.
Figure 5B:
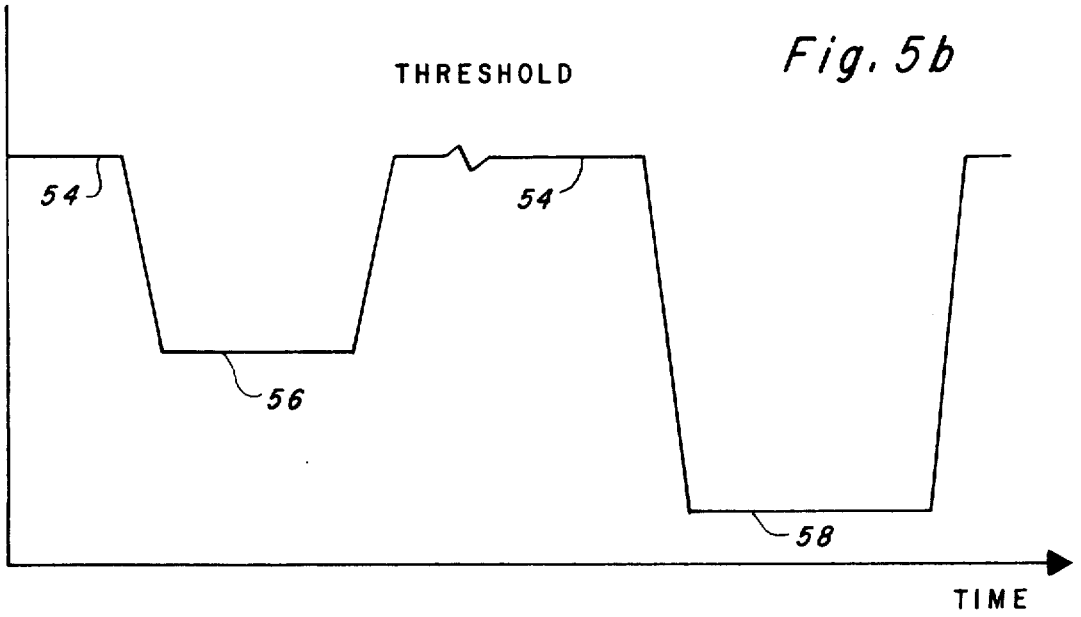

In FIG. 5a, an RF energy signal as a function of time is depicted. In region 50, the signal has a relatively low amplitude while in the region 52, the RF energy level is relatively large. The effect of applying these two different levels of RF energy to the acousto-optic beam deflector in affecting the lasing threshold of the laser cavity may be seen with reference to FIG. 5b. When the signal 50 is applied to the acousto-optic beam deflector 16, the lasing threshold of the cavity, which is normally at a relatively high value 54, is lowered to an intermediate value in the region 56. When the acoustic energy 50 decreases, the lasing threshold again resumes its relatively high value 54. When the second pulse of relatively high energy 52 is applied to the acousto-optic beam deflector 16, the lasing threshold of the laser cavity decreases to a relatively low value in the region 58.

Again referring to FIG. 4a, at time $t_1$ the acousto-optic beam deflector 16 is switched to a value that defines a lasing threshold 42a that is a predetermined energy level below the level of the population inversion 44 at the time $t_1$. This establishes a value for the energy level of the output pulse 46. Subsequent to switching at time $t_1$, the population inversion 44 decreases, since laser action is effected, to a point 44a below the lasing threshold 42a. Energy to the acousto-optic deflector 16 is removed and the threshold 42 resumes a high value indicated generally in the region of 42b. The population inversion increases from the value at 44a in response to the remaining energy in the pulse of pumping energy. In the example 4a, an arbitrary time $t_2$ is chosen, at which an additional laser output pulse of the same amplitude as, for example, pulse 46 is desired. This second output pulse 48 may be produced by controlling the lasing threshold of the laser cavity to a value sufficiently below the value of the population inversion at the point where switching occurs to produce a pulse of the desired amplitude. For example, when the second pulse 48 is desired at time $t_2$, the lasing threshold 42c is adjusted to be a sufficient energy level below the population inversion level 44b such that the desired energy level is obtained in the output pulse 48. The level at the lasing threshold 42c is achieved by applying a sufficient RF energy to the [acoustooptic] *acousto-optic* beam deflector 16.

With reference to FIGS. 4b and 4c, laser output pulses of equal energy level are produced in response to switching the acousto-optic beam deflector 16 at different time intervals. For example, in FIG. 4b, the time interval $t_b$ between Q-switching is larger than the time interval between switching in FIG. 4a, and the time interval $t_c$ between switching in FIG. 4c is larger than that in FIG. 4b. In all three cases, however, the same amplitude output pulses are achieved by varying the lasing threshold of the laser cavity which is, in turn, controlled by varying the amount of RF energy applied to the deflector 16. It is understood, of course, that different energy output pulses could have been produced in examples 4a–4c by appropriately controlling the amount of RF energy applied to the deflector 16.

Figure 6A:
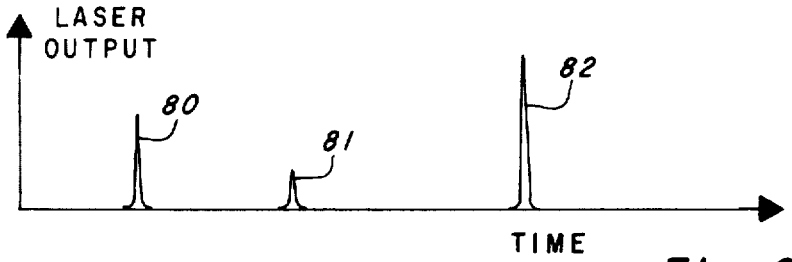
FIGS. 6a–6d is a graph illustrating arbitrary output pulses that may be produced by the system depicted in FIG. 1.
Figure 6B:
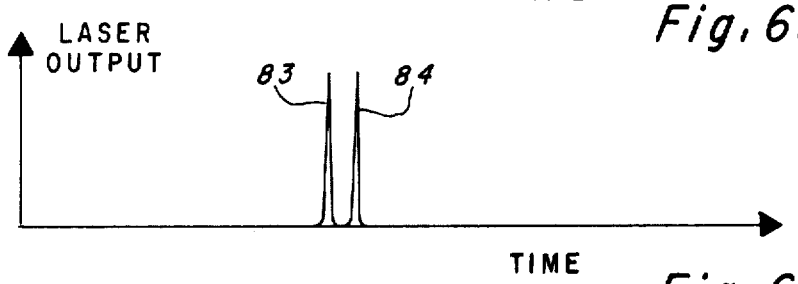
Figure 6C:
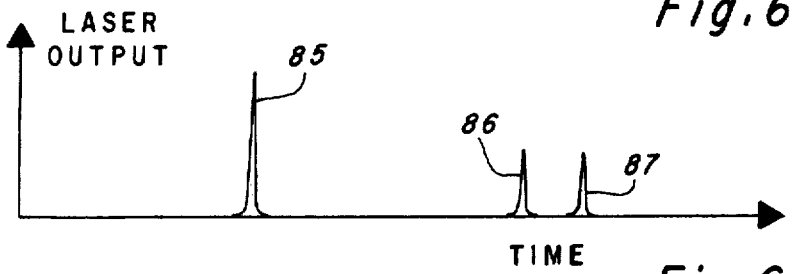
Figure 6D:
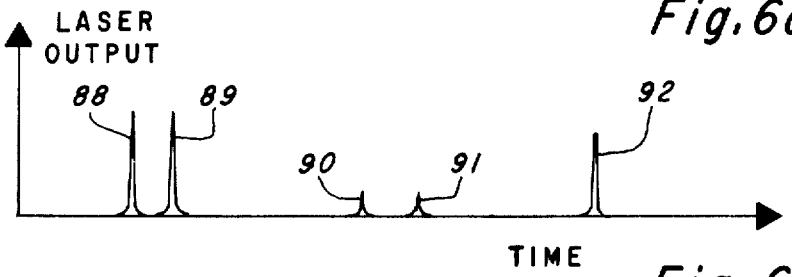

With reference to FIGS. 6a–6d, there is depicted graphs of various sequences of laser output pulses that may be obtained in accordance with the present invention from a single pulse of pump energy. The examples shown in FIGS. 6a–6d are illustrative only and in no way limit the different sequence and amplitude of laser pulses that may be obtained from a single flash of pump energy, the only constraint being conservation of energy; that is, a maximum amount of energy is available in response to any one given flash of pump energy. In accordance with the present invention, this single burst of energy may be divided in any way desired to produce any number of laser pulses. Thus, FIG. 6a shows three laser pulses 80, 81 and 82 at different time intervals and of different amplitude. FIG. 6b depicts two relatively large laser output pulses 83 and 84 spaced closely together. FIG. 6c depicts one initial large laser output pulse 85 and two subsequent closely spaced laser pulses 86 and 87, and FIG. 6d depicts two closely spaced intermediate energy laser pulses 88 and 89, then two relatively closely spaced relatively low amplitude laser pulses 90 and 91, and then a single intermediate amplitude laser pulse 92 at a subsequent time.

Figure 7:
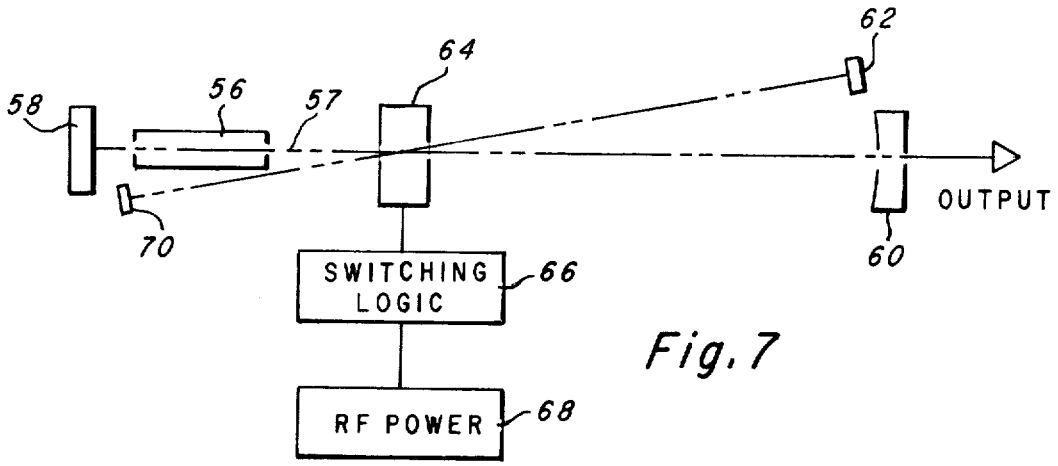
FIGS. 7–9 are schematics of alternate embodiments of the present invention.

With reference to FIG. 7, an alternate embodiment of the present invention is depicted. A laser rod is shown at 56. A reflecting surface, such as a mirror 58, is disposed along and substantially perpendicular to the longitudinal axis 57 of the laser rod 56. A partially transmitting mirror 60 is positioned along the longitudinal axis of laser rod 56 on the opposite side from the mirror 58. In some applications, it may be desirable that the mirror 60 be 100 percent transmitting. In other applications, it may be desirable to have the mirror 60 partially reflecting to provide residual feedback to the laser rod 56 that is less than required for lasing. A feedback reflecting surface 62 may comprise, for example, a 100 percent reflecting mirror. The mirror 62 is positioned so that it is displaced from the longitudinal axis of the laser rod 56. The displacement of the mirror 62 may, for example, be along a line that forms an appropriate angle with the longitudinal axis of the laser rod 56. An acousto-optic beam deflector 64 is positioned along the longitudinal axis of the laser rod 56 between the laser rod and the output mirror 60. Switching logic 66 is operably connected to the acousto-optic beam 64 to selectively apply RF power from the source 68 to the beam deflector to control the amount of optical energy that is deflected by the beam deflector from the laser rod 56. The feedback mirror 62 is positioned so that it is substantially perpendicular to a line joining the mirror 62 and the acousto-optic beam deflector 64. An additional reflecting surface 70 which may for example, comprise a 100 percent reflecting mirror, is positioned along and substantially perpendicular to a line joining the feedback mirror 62 and the acousto-optic deflector 64. The mirror 70, however, is positioned so that the acousto-optic deflector 64 is between mirror 70 and mirror 62. The purpose of the mirror 70 is to reflect "lost radiation" back toward the acousto-optic beam deflector 64 to improve efficiency of the system. That is, a certain amount of the energy emitted by the laser rod 56 is deflected by the beam deflector 64 to the feedback mirror 62. This energy is deflected from the feedback mirror 62 back to the acousto-optic beam deflector 64. A portion of this deflected energy is directed to the laser rod 56. Another portion, however, passes directly through the beam deflector 64 along the line joining the beam deflector 64 and the feedback mirror 62. This portion that passes through the acousto-optic beam deflector 64 without deflection is termed lost radiation. The mirror 70 then reflects this lost radiation and returns it to the system.

With acoustic power on at a power level corresponding to scattering a fraction F of optical energy emitted from the laser rod 10, it may be shown that for one complete round-trip in the laser cavity the quantity $(2 - 2F)/(2 - F)$ of the beam is directed into feedback into the laser rod. For different fractions F of the beam deflected by the beam deflector 64, the percentage of the beam that is directed into output and the percentage of the beam that is directed to feedback is shown in TABLE II. It will be noted that the presence of the mirror substantially eliminates lost radiation.

TABLE II

| F | Output | Feedback |
|---|---|---|
| 10% | 94.7% | 5.3% |
| 20% | 88.9% | 11.1% |
| 30% | 82.4% | 17.6% |
| 40% | 75% | 25% |
| 50% | 66.7% | 33.3% |

Figure 8:
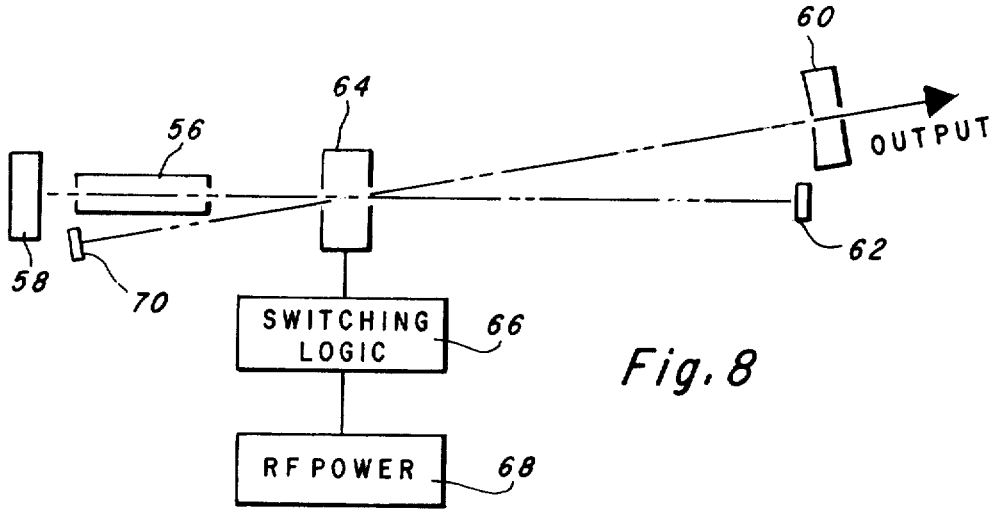

With reference to FIG. 8, a different embodiment of the present invention is depicted that is preferred for relatively low gain laser materials. Again, depending upon system parameters, mirror 60 may be omitted if a 100 percent transmissive mirror were desired. The elements of this embodiment of the invention are the same as those elements shown in FIG. 7, the difference being that the output mirror 60 and the feedback mirror 62 are transposed in this embodiment. That is, the output mirror 60 is positioned at an angle away from the longitudinal axis of the laser rod 56 while the feedback mirror 62 is positioned along the longitudinal axis. In operation of this embodiment of the invention, acoustic power would normally be provided to acousto-optic means 64 at a power level effective to deflect a sufficient portion of the radiation emitted by the laser rod 56 to the output 60 to prevent lasing. This would prevent a portion of the energy from becoming feedback. In this case, the output 60 would be preferably a 100 percent transmitting mirror. To produce a laser output, the switching circuitry 66 would reduce the amount of RF energy from the source 68 so that increasing fractions of the output to laser rod 56 would not be deflected toward the output 60 but would rather be directed to feedback mirror 62 for reflection back to the laser rod 56. Again, the mirror 70 serves to reflect that portion of the energy reflected by the mirror 62 back to the optical beam deflector 64 and deflected down toward the mirror 70.

Figure 9:
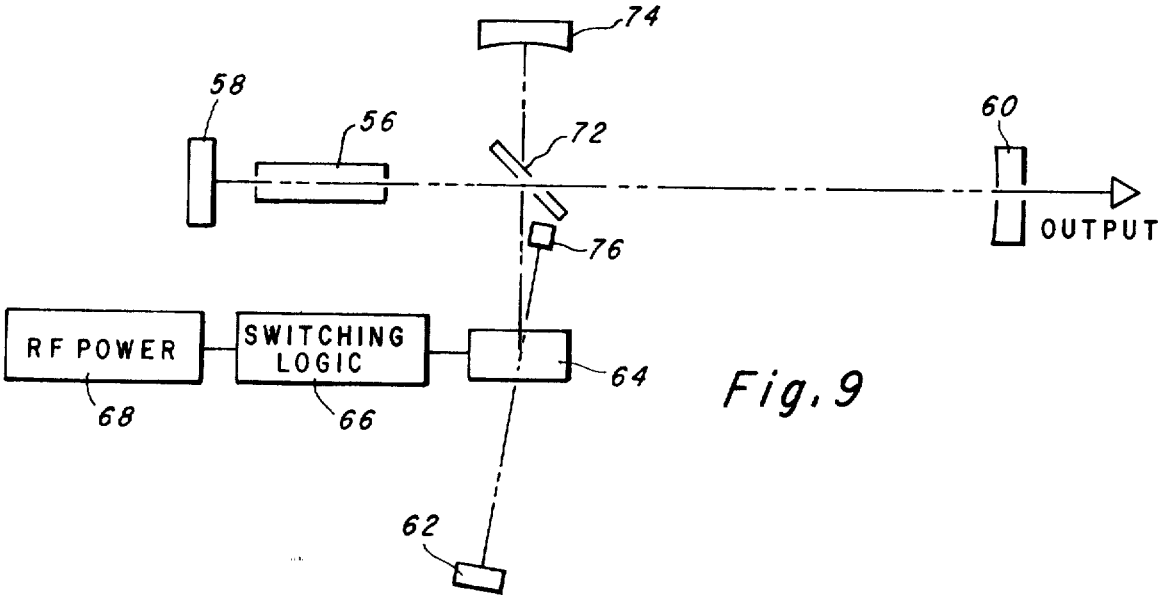

With reference to FIG. 9, an additional embodiment of the invention is depicted. This arrangement is extremely useful where high power laser output pulses are desired. At high power output pulse, the [acoustooptic] *acousto-optic* beam deflector 64 may be damaged. In accordance with the embodiment illustrated in FIG. 9, damage to the beam deflector 64 from high energy laser pulses may be minimized. In this embodiment, a beam splitter 72 is positioned between the laser rod 56 and the output mirror 60. The beam splitter, as understood by those skilled in the art, may be fabricated to have any desired ratio of transmittance to reflectivity, depending upon [deign] *design* considerations. In the present case, optical energy emitted by the laser rod 56 is partially transmitted through the beam splitter 72 toward the output mirror 60 and partially reflected at a 90° angle toward the acousto-optic beam deflector 64. With no applied RF energy to the acousto-optic beam deflector 64, the radiation deflected by the beam splitter 72 toward the acousto-optic beam deflector 64, passes directly through the beam deflector without being deflected and no feedback is provided to the laser rod 56. If an RF signal is, however, applied to the beam deflector 64, a fraction, as explained previously, of the beam is deflected toward the feedback mirror 62. Radiation reflected from the feedback mirror 62 passes back through the acousto-optic deflector 64, a portion of it passing directly through the acousto-optic beam deflector 64 without being deflected, this portion constituting lost radiation and a portion of the reflected radiation is directed toward the beam splitter 72. A portion of this energy is reflected back to the laser rod 56 as feedback and a portion passes directly through the beam splitter 72 and is reflected from the 100 percent reflecting mirror 74. Energy reflected from the mirror 74 either passes directly through the beam splitter 72 back toward the acousto-optic deflector 64 or is reflected at a 90° angle toward the output 60.

With respect to FIG. 9, it is to be appreciated that a mirror 76 may be disposed along the line joining the feedback mirror 62 and the acoustic-optic beam 64 in order to deflect lost radiation as described previously with respect to FIG. 7.

It may be seen from the above detailed description that the various objects of the present invention have been achieved. In addition, numerous advantages are realized. For example, the laser system of the present invention for providing a plurality of pulses at random time intervals and with variable energy levels lends itself directly to digital pulse coding techniques. Further, the laser system has no moving parts, as contrasted with mechanical Q-switching devices. In addition, the turn-on time of conventional acousto-optic beam deflectors is sufficiently fast to enable use of high gain lasers, such as neodymium-yttrium aluminum garnet.

While various embodiments of the present invention have been described, it is to be appreciated that to those skilled in the art various modifications of the details of construction may be made without departing from the spirit or scope of the present invention. For example, various geometrics for forming the laser cavity itself may be utilized; that is, prisms may be used, ring laser configurations, etc.

What is claimed is:

1. A laser system for selectively producing variable energy laser pulses at variable time intervals comprising:

a. a laser cavity that includes a lasing medium *and at least one reflecting means positioned along a line intersecting the longitudinal axis of the lasing medium and angularly displaced from said longitudinal axis to form a preselected angle therewith;* b. means for increasing the population inversion in said lasing medium to stimulate emission of a beam of energy therefrom;

c. control means disposed within said laser cavity for selectively controlling both the energy level of respective output pulses and the time duration between successive pulses, said control means effective to deflect a fraction of said beam at [a] *said* preselected angle responsive to application of ultrasonic power thereto, said fraction being a monotonic increasing function of said ultrasonic power; and d. logic circuitry connected to said control means for selectively applying said ultrasonic power at selected power levels to control the fraction of said beam deflected at said angle, said deflected fraction being reflected *by said at least one reflecting means* to provide energy feedback to said lasing medium, a laser output pulse being produced responsive to said reflected fraction lowering the lasing threshold of said cavity to a value below the level of population inversion in said lasing medium at that time, the energy of said pulse being defined by the amount that said lasing threshold is lowered below the population inversion level.

2. A laser system as set forth in claim 1 wherein said control means comprises an acousto-optic beam deflector operable to deflect radiation emitted by said lasing medium, the fraction of radiation from said [laser] *lasing* medium that is deflected being proportional to the power applied to said deflector from said [control means] *logic circuitry.*

3. A laser system for selectively producing at random intervals laser pulses of variable energy comprising:

a. a laser cavity that includes a rod of lasing material between first and second reflecting means, said second reflecting means being positioned along a line that forms a preselected angle with the longitudinal axis of said laser rod;

b. means for increasing the population inversion in said lasing material to stimulate emission of a beam of energy therefrom;

c. an acousto-optic beam deflector disposed substantially along said longitudinal axis between said laser rod and said second reflecting means operable to selectively control the lasing threshold of said cavity, said deflector effective to deflect a fraction of said beam at said preselected angle *in* response to application of ultrasonic power thereto, said fraction being a monotonic increasing function of said power, said deflected fraction defining the amount of energy feedback to said laser rod; and d. logic circuitry connected to said deflector for selectively applying said ultrasonic power at selected power levels to control the fraction of said beam deflected, thereby controlling the energy level of respective pulses and the time interval therebetween.

4. A laser system as set forth in claim 3 including third [reflective] *reflecting* means disposed along a line joining said second [reflective] *reflecting* means and said deflector, said third [reflective] *reflecting* means being positioned such that said deflector lies between said second and third [reflective] *reflecting* means.

5. A laser system as set forth in claim 4 and further including a fourth [reflective] *reflecting* means disposed along said longitudinal axis, said fourth reflecting means being positioned on the same side of said deflector as said second [reflective] *reflecting* means and being operable to provide a selected amount of feedback to said laser rod.

6. A laser system for selectively producing variable energy pulses at variable time intervals comprising:

a. a laser cavity including a [laser rod] *lasing medium* first and second reflecting means, said first [reflective] *reflecting* means being disposed along and substantially perpendicular to the longitudinal axis of said [laser rod] *lasing medium* and said second reflecting means being displaced from said longitudinal axis;

b. an acousto-optic beam deflector for selectively controlling the lasing threshold of said laser cavity, said deflector disposed within said cavity along said longitudinal axis intermediate said [laser rod] *lasing medium* and said second reflecting means, said second reflecting means being substantially perpendicular to a line joining said second reflecting means and said deflector, said deflector effective to deflect a fraction of an energy beam from said [rod] *lasing medium* at a preselected angle responsive to application of ultrasonic power thereto, said fraction being a monotonic increasing function of said power, said deflected fraction defining the amount of energy feedback to said [laser rod] *lasing medium,* c. a source of RF power;

d. logic control means for selectively applying said RF power to said acousto-optic beam deflector in amounts and at intervals corresponding to desired laser pulses, said applied RF power being effective to deflect a variable portion of the radiation emitted by said [laser rod] *lasing medium* at said preselected angle to said second reflecting means thereby selectively varying the lasing threshold of said cavity; and c. means for increasing the population inversion in said [laser rod] *lasing medium* to stimulate emission of radiation therefrom.

7. A laser system as set forth in claim 6 further including third [reflective] *reflecting* means disposed along the line joining said second [reflective] *reflecting* means and said deflector, said third [reflective] *reflecting* means being positioned such that said deflector lies between said second and third reflecting means.

8. A laser system as set forth in claim 7 further including a fourth reflecting means disposed along said longitudinal axis, said fourth reflecting means being positioned on the same side of said deflector as said second reflecting means and being operable to provide a selected amount of feedback to said [laser rod] *lasing medium.*

9. A laser system for selectively producing variable energy laser pulses at variable time intervals comprising:

a. a laser cavity including a [laser rod] *lasing medium* intermediate first and second reflecting means disposed along and substantially perpendicular to the longitudinal axis of said [laser rod] *lasing medium*, and output means *for said lasing medium* displaced from said longitudinal axis;

b. an acousto-optic beam deflector disposed within said cavity along said longitudinal axis between said [laser rod] *lasing medium* and both said output means and said second reflecting means;

c. a source of RF power;

d. logic control means for selectively applying said RF power to said acousto-optic beam deflector at power levels and at intervals corresponding with desired laser pulses, said applied RF power deflecting radiation emitted by said [laser rod] *lasing medium* away from said second [reflective] *reflecting* means to decrease feedback; and e. means for increasing the population inversion in said [laser rod] *lasing medium* whereby said applied RF power [selectivity] *selectively* varies the amount of radiation reflected back to said [laser rod] *lasing medium* and thus selectively controls the gain of said laser cavity.

10. A laser system as set forth in claim 9 further including third [reflective] *reflecting* means disposed along a line joining said output means and said deflector, said third [reflective] *reflecting* means being positioned such that said deflector lies between said third [reflective] *reflecting* means and said output means.

11. A laser system as set forth in claim 10 [further including] *wherein said output means comprises* a fourth [reflective] *reflecting* means [disposed along] *displaced from* said longitudinal axis, said fourth [reflective] *reflecting* means being positioned on the same side of said deflector as said second reflecting means and being operable to provide a selected amount of feedback to said [laser rod] *lasing medium.*

12. A laser system for selectively producing variable energy laser pulses at variable time intervals comprising:

a. a [laser rod] *lasing medium;* b. first reflecting means positioned from one end of said [laser rod] *lasing medium* along [said] *and* substantially perpendicular to the longitudinal axis of said [laser rod] *lasing medium;* c. output means *for said lasing medium* positioned from the opposite end of said [laser rod] *lasing medium* along said longitudinal axis;

d. a beam splitter positioned along said longitudinal axis between said [laser rod] *lasing medium* and said output means, *said beam splitter being disposed to reflect a portion of the beam transmitted from said lasing medium in a direction substantially perpendicular to the longitudinal axis of said lasing medium;* e. second [reflective] *reflecting* means positioned along a line substantially perpendicular to said longitudinal axis, said second [reflective] *reflecting* means being positioned on the side of said longitudinal axis opposite and in alignment with the direction said beam splitter reflects *said portion of* the beam radiated by said [laser rod] *lasing medium; l* f. acousto-optic beam deflector means positioned along a line substantially perpendicular to said longitudinal axis on the opposite side thereof from said second [reflective] *reflecting* means and in alignment with the *direction to be taken by the* portion of said beam reflected from said beam splitter;

g. control means connected to said *acousto-optic beam* deflector *means* for varying the amount of acoustic power applied thereto;

h. means for increasing the population inversion in said [laser rod] *lasing medium*, and i. feedback reflecting means disposed along a line that forms an angle with said beam reflected by said beam splitter whereby in response to applied power to said *acousto-optic beam* deflector *means* a fraction of the beam from said [laser rod] *lasing medium* reflected by said beam splitter is deflected to impinge upon said feedback reflecting means to be reflected therefrom to provide energy feedback to said [laser rod] *lasing medium*, the portion of said feedback energy that is transmitted through said beam splitter being reflected by said second reflecting means back to said beam splitter.

[13. A laser system as set forth in claim 12 wherein said feedback reflecting means are disposed along a line substantially perpendicular to said longitudinal axis and in alignment with the portion of said beam reflected by said beam splitter.]

14. A laser system as set forth in claim 12 including third [reflective] *reflecting* means disposed along a line joining said feedback [reflective] *reflecting* means and said *acousto-optic beam* deflector *means*, said third [reflective] *reflecting* means being positioned such that said *acousto-optic beam* deflector *means* lies between said third [reflective] *reflecting* means and said feedback [reflective] *reflecting* means.

*15. A laser system for producing laser pulses, comprising:*

*a. a laser cavity that includes a rod of lasing material between first and second reflecting means, said second reflecting means being positioned along a line that forms a preselected angle with the longitudinal axis of said laser rod;*

*b. means for increasing the population inversion in said lasing material to stimulte emission of radiation therefrom;*

*c. an acousto-optic beam deflector disposed substantially along said longitudinal axis between said laser rod and said second reflecting means operable to control the lasing threshold of said cavity; and*

*d. third reflecting means disposed along a straight line passing through said deflector and joining said second reflecting means and said deflector, and said third reflecting means being positioned on the opposite side of said deflector from said second reflecting means; and*

*e. said deflector effective to deflect a fraction of said radiation at said preselected angle in response to application of ultrasonic power thereto, said deflector being further effective to feed back energy from said second reflecting means to said laser rod.*

*16. A laser system as set forth in claim 15, further including a fourth reflecting means disposed along said longitudinal axis, said fourth reflecting means being positioned on the same side of said deflector as said second reflecting means and being operable to provide feedback to said laser rod, in an amount less then required for lasing action.*

*17. A laser system for producing laser pulses, comprising:*

*a. a laser cavity including a lasing medium intermediate first and second reflecting means, said first reflecting means being disposed along and substantially perpendicular to the longitudinal axis of said lasing medium and said second reflecting means being displaced from said longitudinal axis;*

*b. an acousto-optic beam deflector for controlling the lasing threshold of said laser cavity, said deflector disposed within said cavity along said longitudinal axis intermediate said lasing medium and said second reflecting means;*

*c. third reflecting means disposed along a straight line passing through said deflector and joining said second reflecting means and said deflector, and said third reflecting means being positioned on the opposite side of said deflector from said second reflecting means;*

*d. said deflector effective to deflect a fraction of an energy beam from said lasing medium to said second reflecting means, responsive to application of ultrasonic power to said deflector;*

*e. a source of RF power;*

*f. means for applying said RF power to said acousto-optic beam deflector, thereby varying the lasing threshold of said cavity; and*

*g. means for increasing the population inversion in said lasing medium to stimulate emission of radiation therefrom.*

*18. A laser system as set forth in claim 17, further including a fourth reflecting means disposed along said longitudinal axis on the same side of said deflector as said second reflecting means, said fourth reflecting means being operable to provide feedback to said lasing medium, in an amount less than required for lasing action.*

*19. A laser system for producing laser pulses, comprising:*

*a. a lasing medium;*

*b. first reflecting means positioned from one end of said lasing medium along and substantially perpendicular to the longitudinal axis thereof;*

*c. output means for said lasing medium positioned from the opposite end of said lasing medium along said longitudinal axis;*

*d. a beam splitter positioned along said longitudinal axis between said lasing medium and said output means, said beam splitter being disposed to reflect a portion of the beam transmitted from said lasing medium in a direction substantially perpendicular to the longitudinal axis of said lasing medium;*

*e. second reflecting means positioned along a line substantially perpendicular to said longitudinal axis and on the side of said longitudinal axis opposite and in alignment with the direction said beam splitter reflects said portion of the beam radiated by said lasing medium.*

*f. an acousto-optic beam deflector positioned along a line substantially perpendicular to said longitudinal axis on the opposite side thereof from said second reflecting means and in alignment with the direction to be taken by the portion of said beam reflected from said beam splitter;*

*g. means for applying acoustic power to said deflector;*

*h. means for increasing the population inversion in said lasing medium; and*

*i. feedback reflecting means disposed along a line that forms an angle with said beam reflected by said beam splitter, whereby in response to applied power to said deflector a fraction of the beam from said lasing medium reflected by said beam splitter is deflected to impinge upon said feedback reflecting means to be reflected therefrom to provide energy feedback to said lasing medium, the portion of said feedback energy that is transmitted through said beam splitter being reflected by said second reflecting means back to said beam splitter.*

*20. A laser system as set forth in claim 19, further including third reflecting means disposed along a line joining said feedback reflecting means and said deflector, said third reflecting means being positioned such that said deflector lies between said third reflecting means and said feedback reflecting means.*

* * * * *